United States Patent
Tarnawskyj et al.

(10) Patent No.: US 6,203,855 B1
(45) Date of Patent: Mar. 20, 2001

(54) PROCESS FOR PREPARING NONBLEEDING FLUORINATED CARBON AND ZINC OXIDE FILLER LAYER FOR BIAS CHARGING MEMBER

(75) Inventors: Ihor W. Tarnawskyj, Webster; Kock-Yee Law, Penfield; Martin A. Abkowitz, Webster; Frederick E. Knier, Jr., Wolcott; James B. Maliborski, Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/374,042

(22) Filed: Aug. 13, 1999

(51) Int. Cl.$^7$ .................................................. B05D 3/02

(52) U.S. Cl. .................. 427/385.5; 427/409; 427/413; 427/421; 427/428; 427/435

(58) Field of Search .......................... 427/144, 385.5, 427/388.1, 409, 413, 421, 428, 430.1, 435; 492/56; 361/225; 399/31; 430/60–63, 66, 69, 83

(56) References Cited

U.S. PATENT DOCUMENTS

| | | | |
|---|---|---|---|
| 3,872,937 | 3/1975 | Van Gils | 117/72 |
| 3,888,805 | 6/1975 | Van Gils et al. | 260/5 |
| 3,929,920 | 12/1975 | Komo et al. | 260/653.9 |
| 3,932,559 | 1/1976 | Cantor et al. | 260/847 |
| 3,956,566 | 5/1976 | VanGils et al. | 428/375 |
| 3,959,573 | 5/1976 | Eddy et al. | 428/425 |
| 3,959,574 | 5/1976 | Seanor et al. | 428/425 |
| 3,962,011 | 6/1976 | Van Gils | 156/110 A |
| 3,991,027 | 11/1976 | Van Gils et al. | 260/29.3 |
| 4,025,399 * | 5/1977 | Matsumoto et al. | |
| 4,118,235 | 10/1978 | Horiuchi et al. | 106/38.22 |
| 4,173,556 | 11/1979 | Coran et al. | 260/30.8 R |
| 4,251,409 | 2/1981 | Neubert | 260/29.3 |
| 4,259,404 | 3/1981 | Van Gils | 428/395 |
| 4,285,850 | 8/1981 | Neubert | 260/29.6 RB |
| 4,289,683 | 9/1981 | Sugarman et al. | 260/38 |
| 4,308,063 | 12/1981 | Horiuchi et al. | 106/38.22 |
| 4,348,363 | 9/1982 | Akiyama et al. | 422/192 |
| 4,427,803 | 1/1984 | Fukui et al. | 523/402 |
| 4,447,663 | 5/1984 | Akiyama et al. | 570/150 |
| 4,522,907 | 6/1985 | Mitsuhashi et al. | 430/102 |
| 4,524,119 | 6/1985 | Luly et al. | 430/108 |
| 4,816,522 | 3/1989 | Sugarman et al. | 525/340 |
| 4,840,675 | 6/1989 | Fukui et al. | 106/38.22 |
| 5,000,875 | 3/1991 | Kolouch | 252/511 |
| 5,017,432 | 5/1991 | Eddy et al. | 428/422 |
| 5,017,965 | 5/1991 | Hashimoto et al. | 355/219 |
| 5,035,950 | 7/1991 | Rosario | 428/421 |
| 5,112,708 | 5/1992 | Okunuki et al. | 430/31 |
| 5,132,743 | 7/1992 | Bujese et al. | 355/274 |
| 5,166,031 | 11/1992 | Badesha et al. | 430/124 |
| 5,177,538 * | 1/1993 | Mammino et al. . | |
| 5,208,638 | 5/1993 | Bujese et al. | 355/274 |
| 5,244,961 | 9/1993 | Yu et al. | 524/514 |
| 5,259,990 | 11/1993 | Schlueter et al. | 252/500 |
| 5,286,566 | 2/1994 | Schlueter et al. | 428/413 |

(List continued on next page.)

FOREIGN PATENT DOCUMENTS

| | | |
|---|---|---|
| 0 596 477 A2 | 3/1993 | (EP) . |
| 0 606 907 A1 | 1/1994 | (EP) . |
| 8-15960 | 1/1996 | (JP) . |
| 8160759 | 6/1996 | (JP) . |

*Primary Examiner*—Fred J. Parker
(74) *Attorney, Agent, or Firm*—Annette L. Bade (57) ABSTRACT

A process for providing an outer layer on a supporting substrate including mixing an outer layer material with fluorinated carbon and zinc oxide to form a filled outer layer material, and providing at least one of the filled outer layer(s) onto the supporting substrate, where bleeding of contaminants to imaging members is decreased or eliminated.

30 Claims, 2 Drawing Sheets

U.S. PATENT DOCUMENTS

| | | | |
|---|---|---|---|
| 5,286,570 | 2/1994 | Schlueter et al. | 428/423.1 |
| 5,303,014 | 4/1994 | Yu et al. | 355/273 |
| 5,378,526 | 1/1995 | Murata et al. | 128/214 |
| 5,450,184 | 9/1995 | Yanai et al. | 355/299 |
| 5,453,465 | 9/1995 | Yu et al. | 525/179 |
| 5,475,473 | 12/1995 | Masuda et al. | 355/219 |
| 5,485,344 | 1/1996 | Matsumoto et al. | 361/225 |
| 5,499,078 | 3/1996 | Kurokawa et al. | 399/31 |
| 5,547,797 | 8/1996 | Anno et al. | 430/106.6 |
| 5,567,494 | 10/1996 | Ageishi et al. | 428/36.9 |
| 5,574,105 | 11/1996 | Venkataswamy | 525/179 |
| 5,576,805 | 11/1996 | Ishihara et al. | 355/219 |
| 5,587,110 * | 12/1996 | Yamana et al. | |
| 5,602,712 | 2/1997 | Daifuku et al. | 361/225 |
| 5,609,554 | 3/1997 | Hayashi et al. | 492/56 |
| 5,631,316 | 5/1997 | Costemalle et al. | 524/521 |
| 5,744,200 | 4/1998 | Bedesha et al. | 427/387 |
| 5,753,317 * | 5/1998 | Law et al. | |
| 5,849,399 * | 12/1998 | Law et al. | |
| 5,888,690 * | 3/1999 | Yoshinaga et al. | |

\* cited by examiner

PROCESS FOR PREPARING NONBLEEDING FLUORINATED CARBON AND ZINC OXIDE FILLER LAYER FOR BIAS CHARGING MEMBER

CROSS REFERENCE TO RELATED APPLICATIONS

Attention is directed to the following copending applications assigned to the assignee of the present application: U.S. application Ser. No. 09/373,426 filed Aug. 13, 1999, entitled, "Nonbleeding Fluorinated Carbon and Zinc Oxide Filled Layer for Bias Charging Member." The disclosure of this application is hereby incorporated by reference in its entirety.

BACKGROUND OF THE INVENTION

The present invention relates to layers for components, and a process for forming the layers, and more specifically, to fluorinated carbon filled layers useful as layers for components used in electrostatographic processes including image on image, contact electrostatic printing, digital and like processes. In a preferred embodiment, the layers are used in xerographic members such as bias charging members. In embodiments, there are selected fluorinated carbon filled layers which are useful as layers for bias charging rolls, belts, films, sheets and other components. In embodiments, the present invention allows for the preparation and manufacture of bias charging members with superior electrical and mechanical properties, including controlled and uniform conductivity in a desired resistivity range, and increased mechanical strength, durometer, tensile strength, elongation and toughness. Further, in embodiments, the layers exhibit excellent wear properties such as a decrease or elimination of "bleeding" contaminants to the surface of an imaging member.

Methods of charging have been developed using a direct charging member for charging the imaging member. For example, U.S. Pat. No. 5,017,965 to Hashimoto et al., discloses a charging member having a surface layer which comprises a polyurethane resin. Also, European Patent Application 0 606 907 A1, discloses a charging roller having an elastic layer comprising epichlorohydrin rubber, and a surface layer thereover comprising a fluorine containing bridged copolymer.

These and other known charging members are used for contact charging for charging a charge-receiving member (photoconductive member or imaging member) through steps of applying a voltage to the charging member and disposing the charging member being in contact with the charge-receiving member. Such bias charging members require a resistivity of the outer layer within a desired range. Specifically, materials with too low resistivities will cause shorting and/or unacceptably high current flow to the imaging member. Materials with too high resistivities will require unacceptably high voltages. These adverse affects can also cause the bias charging members to have nonuniform resistivity across the length of the contact member. Other problems include resistivity that is susceptible to changes in temperature, relative humidity, and running time.

Attempts at controlling the resistivity within the desired range have focused on controlling the resistivity range at the pre and post nip areas. These attempts have included adding ionic additives to the elastomer layers. European Patent Application 0 596 477 A2, discloses a charging member comprising at least an elastic layer comprising epichlorohydrin rubber and a surface layer disposed thereon, the surface layer comprising at least a semiconductive resin and an insulating metal oxide contained in the semiconductive resin.

While addition of ionic additives to layers may partially control the resistivity of the layers to some extent, there are problems associated with the use of ionic additives. In particular, undissolved particles frequently appear in the layer which causes an imperfection in the layer. This leads to a nonuniform resistivity, which in turn, leads to poor charging properties and poor mechanical strength. Furthermore, bubbles appear in the conductive elastomer, some of which can only be seen with the aid of a microscope, others of which are large enough to be observed with the naked eye. These bubbles provide the same kind of difficulty as the undissolved particles in the elastomer namely, poor or nonuniform electrical properties, poor mechanical properties such as durometer, tensile strength, elongation, a decrease in the modulus and a decrease in the toughness of the material. In addition, the ionic additives themselves are sensitive to changes in temperature, humidity, operating time and applied field. These sensitivities often limit the resistivity range. For example, the resistivity usually decreases by up to two orders of magnitude or more as the humidity increases from 20% to 80% relative humidity. This effect limits the operational or process latitude. Moreover, ion transfer can also occur in these systems. The transfer of ions will lead to contamination problems, which in turn, can reduce the life of the machine. Ion transfer also increases the resistivity of the elastomer member after repetitive use. This can limit the process and operational latitude and eventually, the ion-filled elastomer component will be unusable.

Conductive particulate fillers, such as carbons, have also been used in an attempt to control the resistivity. U.S. Pat. No. 5,112,708 to Okunuki et al., discloses a charging member comprising a surface layer formed of N-alkoxymethylated nylon which may be filled with fluorinated carbon. Generally, carbon additives control the resistivities and provide stable resistivities upon changes in temperature, relative humidity, running time, and leaching out causing contamination to imaging members. However, carbon particles disperse poorly in layers. Further, the required tolerance in the filler loading to achieve the required range of resistivity has been extremely narrow. This along with the large "batch to batch" variation leads to the need for extremely tight resistivity control. In addition, carbon filled layer surfaces have typically had very poor dielectric strength and sometimes significant resistivity dependence on applied fields. This leads to a compromise in the choice of centerline resistivity due to the variability in the electrical properties, which in turn, ultimately leads to a compromise in performance.

Fluorinated carbon has been added to elastomer layers in an attempt to control conductivity within the desired range, and without the negative consequences resulting from use of metal oxides and/or carbon additives. See U.S. patent application Ser. No. 08/672,803, filed Jun. 28, 1996, entitled "Bias Charging Member With Fluorinated Carbon Filled Fluoroelastomer Outer Layer." However, it has been found that when these fluorinated carbon filled fluoroelastomer layers are used as an overcoat for a bias charging member, significant bleeding or leaching contamination to the imaging member results when stored for long periods of time. The result is deposition of unknown residues on the surface of the imaging member. The residues lead to dark line defects in subsequent prints and copies. The residues do not appear to permanently damage the imaging member, but result in unacceptable prints or copies.

A bias charging member may be shipped and stored as a component of a customer replaceable unit. The charging member may then be loaded in intimate contact with an imaging member (e.g., photoreceptor) under spring tension. A bleeding or contamination issue can occur when the customer replaceable unit is stored for extended periods of time in situations that involve elevated temperatures and humidity, for example, storing in a warehouse, trailer, or the like. A "standard accelerated storage test" can be used to determine if any transfer of contaminants occurs under these severe conditions. The storage test involves subjecting the components to one week of 50° C. temperature and 95 percent relative humidity to see if any transfer of contaminants occurs under these severe conditions. A positive result here would indicate the possibility of contamination under more "normal storage" conditions of many months at less severe temperatures and humidity.

Therefore, there exists a specific need accomplished with the present invention, in embodiments thereof, for an outer surface layer for charging members which allows for a stable conductivity in the desired resistivity range without the problems associated with ionic additives and carbon additives, and without bleeding or leaching of contaminants to an imaging member resulting in print quality defects.

SUMMARY OF THE INVENTION

Embodiments of the present invention include: a process for providing an outer layer on a supporting substrate comprising a) mixing an outer layer material with fluorinated carbon and zinc oxide to form a filled outer layer material; and b) subsequently providing at least one of the filled outer layer(s) on said supporting substrate.

Embodiments also include: a process for providing an outer layer on a bias charging member comprising a) mixing an outer layer with fluorinated carbon and zinc oxide to form a filled outer layer material; and b) subsequently providing at least one of the filled outer layer(s) on said bias charging member.

Embodiments further include: a process for providing an outer layer on a supporting substrate comprising a) mixing a material selected from the group consisting of fluoroelastomer and polyamide, with fluorinated carbon and zinc oxide to form a filled outer layer material; and b) subsequently providing at least one of the filled outer layer(s) on said supporting substrate.

DETAILED DESCRIPTION OF THE PRESENT INVENTION

Figure 1:
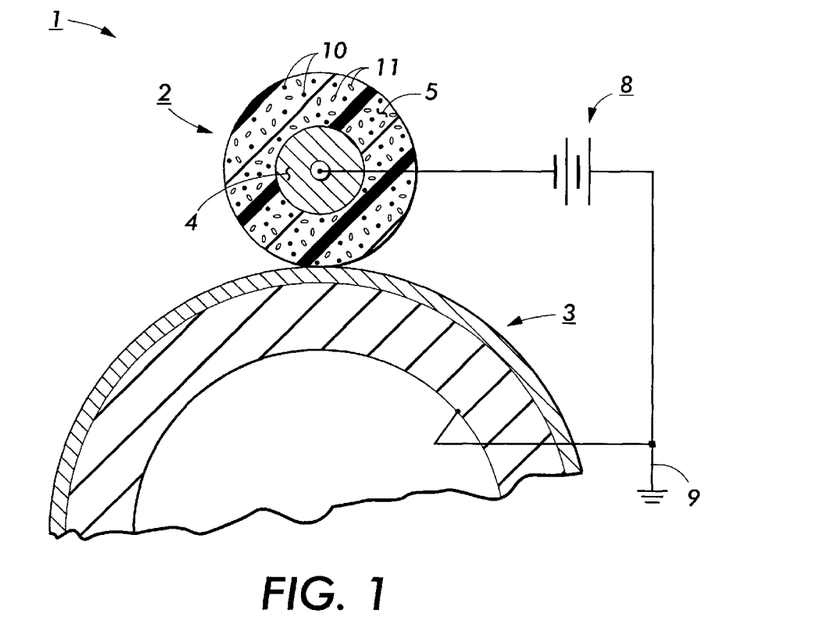
FIG. 1 demonstrates an embodiment of the invention which includes a bias charging roll having an electrically conductive core and an outer surface layer provided thereon.

Referring to FIG. 1, there is shown an embodiment of the present charging system including a charging device 1 having a charge roller 2 held in contact with an image carrier implemented as a photoconductive drum 3. However, the present invention can be used for charging a dielectric receiver or other suitable member to be charged. The photoconductive member may be a drum or a belt or other known photoconductive member. While the charge roller is in rotation, a DC voltage and optional AC current is applied from a power source 9 to the core of the roller 2 to cause it to charge the photosensitive member 3. The charge roller 2 has a conductive core 4 which is comprised of a conductive material such as, for example, a metal. In the embodiment shown, the conductive core 4 is surrounded by a conductive layer 5 comprised of a conductive material such as, for example, a polyamide or fluoroelastomer. Conductive layer 5 has conductive particles dispersed therein, such as, for example fluorinated carbon 10 and zinc oxide 11.

Figure 2:
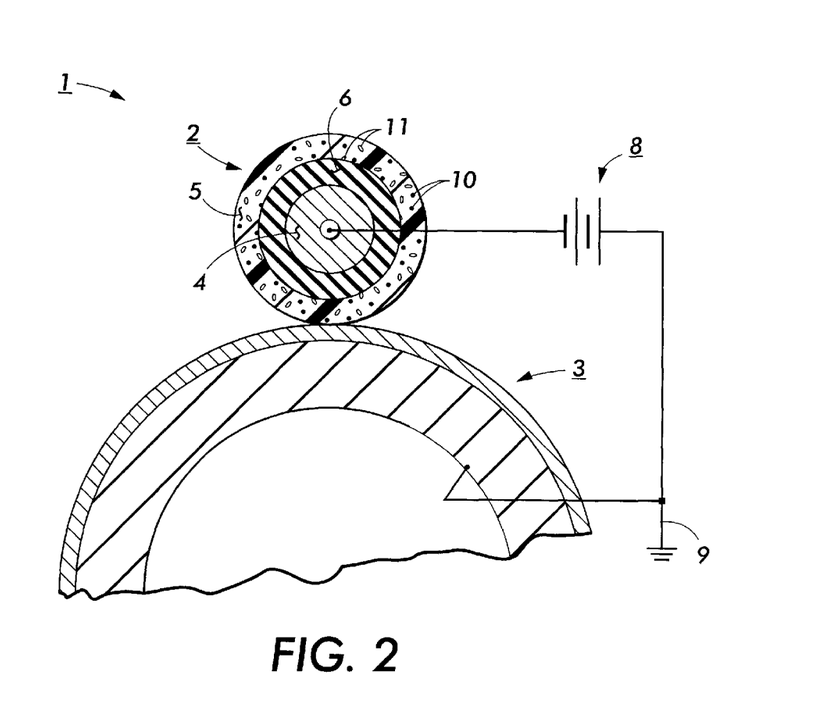
FIG. 2 demonstrates an embodiment of the invention which includes a bias charging roll having an electrically conductive core, an intermediate or under layer provided thereon and an outer surface layer provided on the intermediate layer.

Referring to FIG. 2, there is shown another preferred embodiment of the invention, including all of the elements of FIG. 1 and including an optional intermediate conductive layer 6 (or underlayer) positioned between the outer conductive fluorinated carbon 10 and zinc oxide 11 filled layer 5 and the inner core 4. The intermediate conductive rubber layer may be comprised of, for example, silicone, EPDM, urethane, rubber materials such as styrene-butadiene and nitrile-butadiene rubbers, epichlorohydrin, or the like.

Figure 3:
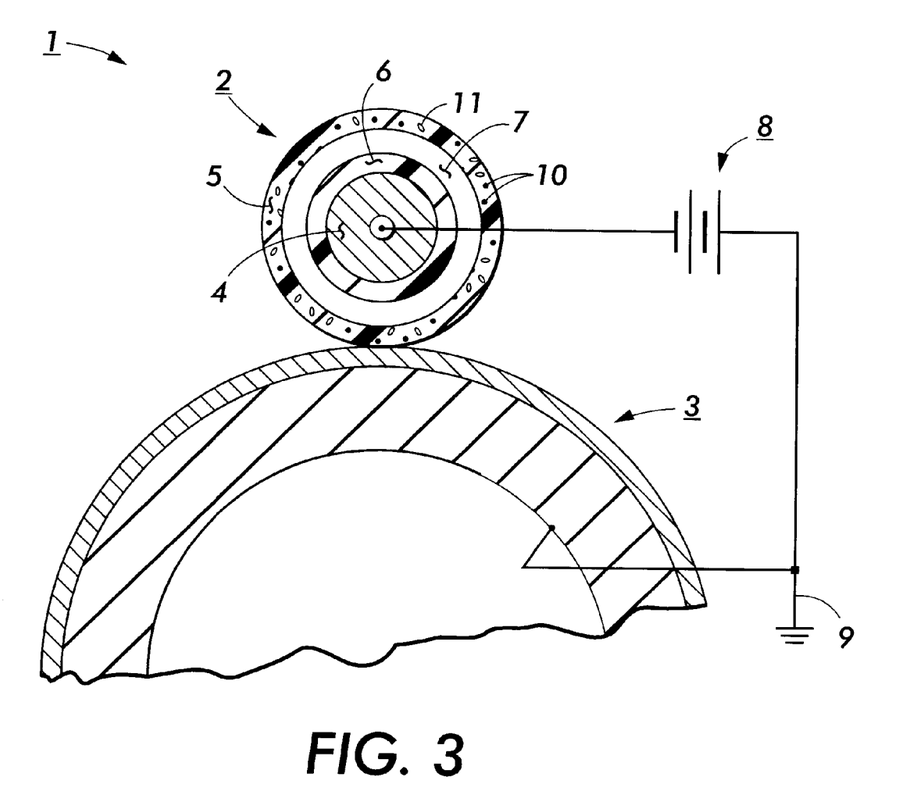
FIG. 3 demonstrates an embodiment of the invention which includes a bias charging roll having an electrically conductive core, an intermediate or underlayer provided thereon and an outer surface layer provided on the intermediate layer, and optionally including adhesive layers between the core and intermediate layer and/or between the intermediate layer and the outer layer.

FIG. 3 shows an alternative preferred embodiment of the present invention including the elements of FIGS. 1 and 2, and including an optional intermediate adhesive layer 7 positioned between the intermediate conductive rubber layer 6 and the outer fluorinated carbon 10 and zinc oxide 11 filled layer 5.

The outer surface 5 of the bias charging system members of the present invention contains fluorinated carbon filled materials. The particular resistivity can be chosen and controlled depending on the amount of fluorinated carbon, the kind of curative, the amount of curative, the amount of fluorine in the fluorinated carbon, and the curing procedures including the specific curing agent, curing time and curing temperature.

The resistivity can be selected not only by using the appropriate curing agents, curing time and curing temperature as set forth herein, but also by selecting a specific fluorinated carbon, or mixtures of various types of fluorinated carbon. The percentage of fluorine in the fluorinated carbon will also affect the resistivity of the material when mixed therewith. The fluorinated carbon may crosslink with a layer material provides embodiments superior results by providing a bias charging member outer surface having a resistivity within the desired range which is virtually unaffected by numerous environmental and mechanical changes.

Fluorinated carbon, sometimes referred to as graphite fluoride or carbon fluoride is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systematic, uniform variation of its electrical resistivity properties. Controlled and specific resistivity is a highly desired feature for an outer surface of a bias charging system member.

Fluorinated carbon is a specific class of compositions which is prepared by the chemical addition of fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some confusion in the art, it is apparent that fluorinated carbon is neither a fluorocarbon nor a fluoropolymer and the phrase fluorinated carbon is used in this context herein.

The fluorinated carbon material may be any of the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608. Essentially, fluorinated carbon is produced by heating a carbon source such as amorphous carbon, coke, charcoal, carbon black or graphite with elemental fluorine at elevated temperatures, such as 150°–600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x representing the number of fluorine atoms and generally being up to about 1.2, preferably from about 0.02 to about 1.5, and particularly preferred from about 0.04 to about 1.4. $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Daikin Industries, Inc., New York, N.Y.; and Advanced Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$, wherein n represents the number of $C_2F$ components. Preparation of $(C_2F)_n$ type fluorinated carbon is described, for example, in above-mentioned U.S. Pat. No. 4,247,608, and also in Watanabe et al., "Preparation of Poly(dicarbon monofluoride) from Petroleum Coke", Bull. Chem. Soc. Japan, 55, 3197–3199 (1982).

In addition, preferred fluorinated carbons useful herein include those described in U.S. Pat. No. 4,524,119 to Luly et al., and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have approximately 28 and 11 percent fluorine content, respectively. ACCUFLUOR® 1000 and ACCUFLUOR® 2065 have 62 and 65 percent fluorine content respectively. Also, ACCUFLUOR® 1000 comprises carbon coke, whereas ACCUFLUOR® 2065, 2028 and 2010 all comprise conductive carbon black. These fluorinated carbons have the formula $CF_x$ and are formed by the reaction of $C+F_2=CF_x$.

The following chart demonstrates some properties of four preferred fluorinated carbons useful in the present invention.

| PROPERTIES | ACCUFLUOR | | | | UNITS |
|---|---|---|---|---|---|
| GRADE | 1000 | 2065 | 2028 | 2010 | N/A |
| Feedstock | Coke | Conductive Carbon Black | | | N/A |
| Fluorine Content | 62 | 65 | 28 | 11 | % |
| True Density | 2.7 | 2.5 | 2.1 | 1.9 | g/cc |
| Bulk Density | 0.6 | 0.1 | 0.1 | 0.09 | g/cc |
| Decomposition Temperature | 630 | 500 | 450 | 380 | ° C. |
| Median Particle Size | 8 | <1 | <1 | <1 | micrometers |
| Surface Area | 130 | 340 | 130 | 170 | $m^2/g$ |
| Thermal Conductivity | $10^{-3}$ | $10^{-3}$ | $10^{-3}$ | N.A | cal/cm-sec-° C. |
| Electrical Resistivity | $10^{11}$ | $10^{11}$ | $10^8$ | <10 | ohm-cm |
| Color | Gray | White | Black | Black | N/A |

As has been described herein, it is a major advantage of the invention to be able to vary the fluorine content of the fluorinated carbon to permit systematic uniform variation of the resistivity properties of the biasable charging member. The preferred fluorine content will depend on the equipment used, equipment settings, desired resistivity, and the specific outer layer material chosen. The fluorine content in the fluorinated carbon is from about 1 to about 70 weight percent (carbon content of from about 99 to about 30 percent by weight) based on the weight of fluorinated carbon, preferably from about 5 to about 65 (carbon content of from about 95 to about 35 weight percent), and particularly preferred from about 10 to about 30 weight percent (carbon content of from about 90 to about 70 weight percent.

The median particle size of the fluorinated carbon can be less than 1 micron and up to 10 microns, is preferably less than 1 micron, and particularly preferred from about 0.1 to about 0.5 micron. The surface area is preferably from about 100 to about 400 $m^2/g$, preferred of from about 110 to about 340, and particularly preferred from about 130 to about 170 $m^2/g$. The density of the fluorinated carbons is preferably from about 1.5 to about 3 g/cc, preferably from about 1.9 to about 2.7 g/cc.

The amount of fluorinated carbon used is for example from about 1 to about 40, and preferably from about 3 to about 30 percent based on the weight of total solids. An amount of from 5 to about 15 percent fluorinated carbon based on the weight of total solids is desired. Total solids as used herein refers to the amount of outer layer material(s).

It is preferable to mix different types of fluorinated carbon to tune the mechanical and electrical properties. It is desirable to use mixtures of different kinds of fluorinated carbon to achieve good conductivity while reducing the hardness of the layer. Also, mixtures of different kinds of fluorinated carbon can provide an unexpected wide formulation latitude and controlled and predictable conductivity. For example, an amount of from about 0 to about 40 percent, and preferably from about 1 to about 35 percent by weight of ACCUFLUOR 2010 can be mixed with an amount of from about 0 to about 40 percent, preferably from about 1 to about 35 percent ACCUFLUOR 2028, and particularly preferred from about 8 to about 25 percent ACCUFLUOR 2028. Other forms of fluorinated carbon can also be mixed. All other combinations of mixing the different forms of ACCU-FLUOR are possible. A preferred mixture is from about 0 to about 15 percent ACCUFLUOR 2028 mixed with from about 2 to about 3.5 percent ACCUFLUOR 2010. Another preferred mixture is from about 5 to about 10 percent ACCUFLUOR 2028 mixed with from about 2.0 to about 3.0 percent ACCUFLUOR 2010. A particularly preferred mixture is from about 2 to about 3 percent ACCUFLUOR 2028 mixed with from about 2.5 to about 3 percent ACCUFLUOR 2010, and even more preferred is a mixture of about 3 percent ACCUFLUOR 2010 and about 2 percent ACCUFLUOR 2028. All the above percentages are by weight of the total solids.

It is preferred to add zinc oxide to the fluorinated carbon in combination as fillers for the outer layer of the bias charging member. Preferably, zinc oxide is added in an amount of from about 1 to about 15, and preferably from about 5 to about 8 percent by weight of the material in the outer layer.

Preferred resistivity ranges may vary for bias charging systems designed to operate at different throughput speeds and is selected to correspond to the roller or belt surface speed and nip region dimension such that the time necessary to transmit a charge from the conductive core to the external surface of the bias charging system member is roughly greater than the dwell time for any point on the bias charging system member in the charging nip region. Ideally, the external voltage profile of the bias charging system member provides a field strength above that which is necessary for substantial air ionization in the air gap at the entrance of the nip, and above that required for air ionization in the air gap just beyond the exit of the nip.

Examples of the outer layer materials for use in the outer surface 5 and intermediate or underlayer 6 of the bias charging system members include fluoroelastomers (including those under the trademark VITON® sold by DuPont), epichlorohydrin, polyimides, polyamides, sulfones, polyvinyl butyrate, fluorosilicones, urethanes, and the like.

Preferred materials for the outer layers 5 include polyamides such as those sold under the tradename NYLON, such as NYLON 6, NYLON 66, Nylon 12, CM-8000 from Toray or Lukamid, and the like.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures of which are incorporated by reference herein in their entirety. As described therein these fluoroelastomers, particularly from the class of copolymers and terpolymers of vinylidenefluoride hexafluoropropylene and tetrafluoroethylene, are known commercially under various designations as VITON A®, VITON E®, VITON E60C®, VITON E430®, VITON 910®, VITON GH® and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylenetetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company.

Preferred fluoroelastomers useful for the outer surface 5 of the bias charging system members include fluoroelastomers, such as fluoroelastomers of vinylidenefluoride based fluoroelastomers, which contain hexafluoropropylene and tetrafluoroethylene as comonomers. Two preferred known fluoroelastomers are (1) a class of copolymers of vinylidenefluoride and hexafluoropropylene known commercially as VITON A® and (2) a class of terpolymers of vinylidenefluoride, hexafluoropropylene and tetrafluoroethylene known commercially as VITON B®. VITON A®, and VITON B®, and other VITON® designations are trademarks of E.I. DuPont de Nemours and Company. Other commercially available materials include FLUOREL™ of 3M Company, VITON GH®, VITON E60C®, VITON B 910®, and VITON E 430®.

In another preferred embodiment, the fluoroelastomer is one having a relatively low quantity of vinylidenefluoride, such as in VITON GF®, available from E.I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer. Examples of cure site monomers include 4-bromoperfluorobutene-1, 1,1-dihydro-4-bromoperfluorobutene-1, 3-bromoperfluoropropene-1, 1,1-dihydro-3bromoperfluoropropene-1, and commercially available cure site monomers available from, for example, DuPont. Also preferred are VITON® B50 and VITON® E45. The fluoroelastomer of the outer surface is filled with fluorinated carbon.

Other materials useful in the present invention include silicone rubbers, polyurethane, ethylene-propylene-diene monomer (hereinafter "EPDM"), nitrile butadiene rubber (hereinafter "NBR"), epichlorohydrin, styrene-butadiene, fluorosilicone, and copolymers thereof. These elastomers, along with adhesives, are included as intermediate layer(s) (7 in FIG. 3).

The preferred materials for the intermediate or underlayer 6 of the present charging members include EPDM (ethylene propylene diene monomer), silicone rubbers, urethane, styrene butadiene, fluorosilicone, epichlorohydrin, styrenebutadiene, nitrile butadiene, and copolymers thereof. Optionally, the intermediate layer 6 may be loaded with conductive materials such as metal oxides such as titanium oxide, zinc oxide, tin oxide, antimony dioxide, indium oxide, indium tin oxide, and the like; and carbons such as carbon black, carbon graphite, and the like.

The amount of outer layer material used to provide the surface of the present invention is dependent on the amount necessary to form the desired thickness of the layer or layers of surface material. Specifically, the outer layer material is added in an amount of from about 50 to about 99 percent, preferably about 70 to about 99 percent by weight of total solids.

Any known solvent suitable for dissolving the outer layer material may be used in the present invention. Examples of suitable solvents for the present invention include methyl ethyl ketone, methyl isobutyl ketone, diethyl ketone, cyclohexanone, n-butyl acetate, amyl acetate, and the like. The purpose of the solvent is to wet the outer layer material. Specifically, the solvent is added in an amount of from about 25 to about 99 percent, preferably from about 70 to about 95 percent.

Known curing agents have been selected in the past from basic metal oxides such as MgO, CaO, Ca(OH)$_2$ and the like, and strong nucleophilic agents such as primary, secondary and tertiary, aliphatic and aromatic amines, where the aliphatic and aromatic amines have from about 2 to about 15 carbon atoms. Also included are aliphatic and aromatic diamines and triamines having from about 2 to about 30 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred.

In a preferred embodiment, DIAK 3 (N,N'-dicinnamylidene-1,6 hexane diamine) from DuPont or hexamethylene diamine carbamate is used as the curing agent, along with zinc oxide in order to produce an outer layer which is less susceptible to bleeding contamination into the photoreceptor. Preferably zinc oxide is used as the curing agent. The curing agent is used in an amount of from about 0.5 to about 10, and preferably from about 3 to about 6 percent by weight based on the amount of outer layer. Relatively high levels of Diak may contribute to the contamination problem if not fully consumed in the postcure step and very low levels might not "activate" conductivity in the filler or yield any appreciable crosslinking in the outer layer.

The bias charging member may take any suitable form such as a roller, film, sheet, blade, belt, brush or the like. In the case of a roller, the conductive core for the bias charging system member, including bias charging roller, may be of any suitable conductive material. Typically, it takes the form of a cylindrical tube or a solid cylindrical shaft of aluminum, copper, stainless steel, iron, or certain plastic materials chosen to maintain rigidity, structural integrity and capable of readily responding to a biasing potential placed thereon. It is preferred to use a solid cylindrical shaft of aluminum or stainless steel. In preferred embodiment, the diameter of the cylindrical shaft is from about 3 to about 10 mm, preferably 8 mm, and the length is from about 10 to about 500 mm.

Optional intermediate adhesive layers 7 and/or elastomer layers 7 may be applied to achieve desired properties and performance objectives of the present invention. An adhesive intermediate layer may be selected from, for example, epoxy resins and polysiloxanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41.

The bias charging system member may have an outer layer of a fluorinated carbon filled outer layer material 5 provided directly on the core. In this configuration, it is preferred that the outer layer have a resistivity of from about $10^8$ to about $10^{12}$ ohm/sq, and particularly preferably of from $10^9$ to about $10^{10}$ ohm/sq.

Also, with this configuration, the thickness of the outer surface layer is from about 0.005 to about 5 mm, preferably from about 0.01 to about 0.05 mm.

In a preferred embodiment, an elastomer layer 6 may be provided on the core, and a fluorinated carbon filled outer surface layer 5 provided on the elastomer layer 6. In this preferred configuration, the conductive rubber layer 6 has a resistivity of from about $10^5$ to about $10^9$ ohms/sq. The conductive rubber intermediate layer 6 has a thickness of from about 0.5 to about 5 mm, preferably from about 1 to about 4 mm. In this configuration which includes a conductive rubber intermediate layer 6, the outer surface layer 5 comprising a fluorinated carbon filled outer layer has a resistivity of from about $10^5$ to about $10^{12}$ ohm-cm, preferably from about $10^7$ to about $10^{11}$ ohm-cm. Also, in this configuration, the outer fluorinated carbon filled fluoroelastomer layer 5 has a thickness of from about 1 to about 500 μm, preferably from about 5 to about 100 μm. The hardness of the outer layer 5 in this configuration is about less than 90 Shore A, preferably from about 30 to about 70 Shore A, and particularly preferred from about 40 to about 60. The hardness of the intermediate layer 6 in this configuration is from about 70, preferably from about 30 to about 50.

When the intermediate layer is an elastomer layer, there may be provided an adhesive layer (not shown in the figures) between the core and the intermediate layer 6. There may also be another adhesive layer 7 between the intermediate layer 6 and the outer layer 5. In the absence of an intermediate layer, the fluorinated carbon filled outer layer may be provided directly onto the core or may be bonded to the core via an adhesive layer.

The outer layer of the bias charging member is preferably prepared by mixing a solvent such as methanol/butanol, methyl ethyl ketone, methyl isobutyl ketone, butyl acetate, and the like with the desired type(s) and amount(s) of outer layer material. To the outer layer mixture is added fluorinated carbon and zinc oxide, along with steel shots for mixing. A curative such as DIAK 3 from DuPont can be added after premixing with methanol or a like solvent. The steel shot is filtered, the dispersion collected and then coated onto the substrate. The coating can be air dried, followed by heat curing for from about 2 to about 12 hours, and preferably about 3 hours, at a temperature of from about 150 to about 200° C., and preferably about 175° C.

The intermediate and outer surfaces are deposited on the substrate via dipping, rolling, spraying such as by multiple spray applications of very thin films, casting, flow roll coating, or by other suitable, known methods. It is preferred to spray coat the layers.

The bias charging members herein having outer surface layers comprising fluorinated carbon and zinc oxide filled outer layers exhibit superior electrical and mechanical properties. The members are designed so as to enable control of electrical properties including control of conductivity in the desired resistivity range. Also, the resistivity is uniform across the entire length of the bias charging member. Further, the bias members herein have decreased sensitivities to changes in temperature, relative humidity, corona exposure, corrosive environments, solvent treatment, cycling to high electric fields, and running time.

Contamination may occur upon long term storage of the customer replaceable unit. The bias charging member may be placed in contact with a photoreceptor during storage and this is when bleeding contamination may occur. The present invention reduces or eliminates the bleeding contamination problems. In tests, it has been shown that the bleeding was prevented by use of embodiments, when the biasable member was contacted with an imaging member for about 1 week at a temperature of about 50° C. and about 95 percent relative humidity.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Preparation of Fluorinated Carbon and Zinc Oxide Filled Polyamide Outer Layer

A coating dispersion was prepared by first mixing 100 grams of methanol/butanol (1:1) and 15 grams of polyamide (NYLON® CM8000 pellets from Toray, Inc.) in an 8 ounce bottle. The mixture was allowed to stand covered overnight. The swollen pellets/solvent mixture was warmed to about 60° C. for approximately 3 hours with occasional stirring to complete the dissolution.

The clear NYLON® solution was cooled to room temperature and was charged with 2.85 grams of fluorinated carbon filler (ACCUFLUOR® CFx2028 from Allied Signal), 1.0 gram zinc oxide (from Harwick) and about 50 grams 1/8 inch steel shots. The bottle was placed in a paint shaker for 20 minutes to disperse the additives. A curative, about 0.75 grams of an amine curative (N,N'-dicinnamylidene-1,6 hexane diamine sold under the name DIAK 3 from DuPont) was pre-dissolved in approximately 10 ml of methanol and was added to the dispersion approximately 1 hour prior to the coating.

The final dispersion was filtered through a wire screen to separate the shot and collected in an 8 ounce polypropylene bottle. The dispersion might be diluted with butanol to adjust viscosity and was spray coated onto a carbon-loaded epichlorohydrin rubber core from Acadia (3-mm hard rubber on a 8-mm diameter steel shaft). The coated layer was air-dried overnight followed by heat curing in a forced air oven at 175° C. for about 3 hours.

Example II

Preparation of Fluorinated Carbon and Zinc Oxide Filled Fluoroelastomer Outer Layer A coating dispersion was prepared in the following manner. About 2300 grams of steel shot, 8 grams of fluorinated carbon filler (ACCUFLUOR® 2028 from Allied Signal) and 200 grams of methyl isobutyl ketone (MIBK) were added to a small bench top attritor. The mixture was stirred for a few minutes at low speed to wet the fluorinated carbon particles with the solvent. About 45 grams of a fluoroelastomer (VITON® GF from Dupont) was then added and the mixture was attrited for 30 minutes at a moderate speed.

Curing agents, including 3 grams ZnO (from Harwick) and 2.4 grams N,N'-dicinnamylidene-1,6 hexane diamine (Diak 3 from Dupont), were then introduced to the mixture. The mixture was attrited for an additional 15 minutes at a more aggressive speed followed by filtration through a wire screen and collected in an 8 ounce polypropylene bottle. The dispersion was diluted with an additional 150 grams MIBK and spray-coated onto a carbon-loaded epichlorohydrin rubber core from Acadia (3-mm hard rubber on a 8-mm diameter steel shaft). The coated layer was air-dried overnight followed by heat curing at 175° C. for 3 hours. The thickness of the surface resistive layer was about 1 mil. A series of prototype bias charging rollers with slight variations of the above formulation were prepared. These rolls were evaluated on a Xerox DocuCentre machine, DC230SL, to determine the charging characteristic, development potential (Vh), charge uniformity, etc., provided by the bias charging roller prototype. The performance of a commercially available bias charging roller from Tokai Rubber of Japan was also measured and used as a reference in these tests. The data is summarized below:

TABLE 1

| ROLL | Vh (20% relative humidity, 60 °F.) |
|---|---|
| Tokai-1 | 414 |
| Tokai-2 | 418 |

TABLE 1-continued

| ROLL | Vh (20% relative humidity, 60 °F.) |
|---|---|
| H-67 | 418 |
| H-68 | 410 |
| H-69 | 422 |
| H-71 | 419 |
| H-74 | 415 |

Example III

Preparation of Fluorinated Carbon and Magnesium Oxide Filled Fluoroelastomer Outer Layer A coating dispersion was prepared in the following manner. About 2300 grams of a steel shot, 8 grams of fluorinated carbon filler (ACCUFLUOR® 2028 from Allied Signal) and 200 grams of MIBK were added to a small bench top attritor. The mixture was stirred for a few minutes at low speed to wet the fluorinated carbon particles with the solvent. Approximately 45 grams of a fluoroelastomer (VITON® GF from Dupont) was then added and the mixture was attrited for 30 minutes at a moderate speed.

Curatives including 3 grams MgO (Maglite-Y from Merck) and 2.12 grams amine curative (Diak 3 from Dupont) were then introduced to the mixture. The mixture was attrited for an additional 15 minutes at a more aggressive speed followed by filtration through a wire screen and collected in an 8 ounce polypropylene bottle. The dispersion was diluted with an additional 150 grams MIBK and spray-coated onto a carbon-loaded epichlorohydrin rubber core from Acadia (3-mm hard rubber on a 8-mm diameter steel shaft). The coated layer was air-dried overnight followed by heat curing at 175° C. for 3 hours. The thickness of the surface resistive layer was about 1 mil.

A series of prototype bias charging rollers with slight variations of the above formulation were prepared. These rolls were evaluated on a Xerox DocuCentre machine, DC230SL, to determine the charging characteristic, development potential (Vh), charge uniformity, etc., provided by the bias charging roller prototype. The performance of a commercially available bias charging roller from Tokai Rubber of Japan was also measured and used as a reference in these tests. The data is summarized below:

TABLE 2

| ROLL | Vh (20% relative humidity, 60° F.) |
|---|---|
| Tokai-1 | 416 |
| H-01 | 416 |
| H-02 | 405 |
| H-03 | 413 |

Example IV

Preparation of Fluorinated Carbon and Magnesium Oxide Filled Polyamide Outer Layer A coating dispersion was prepared by first mixing 100 grams of methanol/butanol (1:1) and 15 grams of a polyamide (NYLON® CM8000 pellets from Toray, Inc.) in an 8 ounce bottle. The mixture was allowed to stand covered overnight. The swollen pellets/solvent mixture was warmed to about 60° C. for approximately 3 hours with occasional stirring to complete the dissolution.

The clear polyamide solution was cooled to room temperature and was charged with 1.66 grams of fluorinated carbon filler (ACCUFLUOR® CFx2028 from Allied Signal), 0.85 gram Maglite-Y (from Merck) and about 50 grams ⅛ inch steel shots. The bottle was placed in a paint shaker for 20 minutes to disperse the additives. A curative, about 0.85 grams of an amine curative (DIAK 3 from DuPont) was pre-dissolved in approximately 10 ml of methanol and was added to the dispersion approximately 1 hour prior to the coating.

The final dispersion was filtered through a wire screen to separate the shot and collected in an 8 ounce polypropylene bottle. The dispersion might be diluted with butanol to adjust viscosity and was spray-coated onto a carbon-loaded epichlorohydrin rubber core from Acadia (3-mm hard rubber on a 8mm diameter steel shaft). The coated layer was air-dried overnight followed by heat curing in a forced air oven at 175° C. for about 3 hours.

Example V

Bleeding Performance Evaluation

A series of prototypes representative of examples I–IV were prepared. These prototypes were evaluated on a Xerox prototypes xerographic machine fixture to determine characteristics such as development potential (Vh), charge uniformity, and like parameters. Representative bias charging roller prototype samples were then subjected to an accelerated storage stress test for one week duration at 50° C. and 95% relative humidity while loaded against an imaging member (photoreceptor). At the end of the storage period, the imaging member was visually inspected then installed into a Xerox printer and print tested to reveal any print defects caused by contamination of the imaging member by the bias charging rollers. The data is summarized in Table 3 below.

TABLE 3

| Sample Number | Vh (20% RH, 60° F.) | Storage Test (Bleeding) |
|---|---|---|
| Example I (Invention) | 416 V | No |
| Example II (Invention) | 418 V | No |
| Example III (Comparison) | 416 V | Yes |
| Example IV (Comparison) | 413 V | Yes |

The above results demonstrate that the fluorinated carbon/zinc oxide polyamide and fluorinated carbon/zinc oxide fluoroelastomer outer layers demonstrated no bleeding as compared to known fluorinated carbon/magnesium oxide polyimide and fluorinated carbon/magnesium oxide fluoroelastomer outer layers.

Example VI

Print Wear Life Performance Evaluation

Samples from Examples I, II and IV were placed in a Xerox photocopy machine and were subjected to print wear life testing by running 60,000 copies each with periodic disassembly to measure performance and wear. The data below shown in Table 4 demonstrates that the print wear life of the polyimide fluorinated carbon/zinc oxide layers is superior. Specifically, the bias charging rollers designed using one embodiment of the invention introduces less wear to the photoreceptor as compared to the known outer layer bias charging members. More specifically, the charging performance of the rolls in accordance with one embodiment of the invention do not appear to deteriorate after over 30K prints. In the table below, "PR" refers to photoreceptor.

TABLE 4

| Sample Number | PR wear at 20K (microns) | PR wear at 30K (microns) | PR wear at 40K (microns) |
|---|---|---|---|
| Example I (Invention) | 5.06 | 7.96 | 11.22 |
| Example II (Invention) | 5.24 | 7.62 | (No data) |
| Example IV (Comparison) | 6.54 | 10.4 | 12.90 |

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A process for providing an outer layer on a supporting substrate comprising:
   a) mixing an outer layer material with fluorinated carbon and zinc oxide in an amount of from about 1 to about 15 percent by weight of the material in the outer layer to form a filled outer layer material; and
   b) subsequently applying at least one layer of said filled outer layer material on said supporting substrate.

2. A process in accordance with claim 1, wherein said outer layer material is selected from the group consisting of fluoroelastomers, polyamides, polyimides and epichlorohydrin.

3. A process in accordance with claim 2, wherein said outer layer material comprises a polyamide.

4. A process in accordance with claim 2, wherein said outer layer material comprises a fluoroelastomer.

5. A process in accordance with claim 1, wherein said supporting substrate is a bias charging member.

6. A process in accordance with claim 1, further comprising:
   c) heat curing said at least one of said filled outer layer on said supporting substrate at a temperature of from about 150 to about 200° C. for a time of from about 2 to about 12 hours.

7. A process in accordance with claim 6, wherein said temperature is about 175° C., and said time is about 3 hours.

8. A process in accordance with claim 1, wherein the fluorinated carbon is of the formula $CF_x$, and x represents the number of fluorine atoms.

9. A process in accordance with claim 8, wherein the fluorinated carbon is of the formula $CF_x$, wherein x is from about 0.02 to about 1.5.

10. A process in accordance with claim 9, wherein the fluorinated carbon is of the formula $CF_x$, wherein x is from about 0.04 to about 1.4.

11. A process in accordance with claim 1, wherein said fluorinated carbon is selected from the group consisting of a fluorinated carbon having a fluorine content of about 62 weight percent, a fluorinated carbon having a fluorine content of about 11 weight percent, a fluorinated carbon having a fluorine content of about 28 weight percent, and a fluorinated carbon having a fluorine content of about 65 weight percent, based on weight of total solids.

12. A process in accordance with claim 11, wherein the fluorinated carbon is present in an amount of from about 5 to about 10 percent by weight of a fluorinated carbon having a fluorine content of about 28 weight percent, and from about 2 to about 3 percent by weight of a fluorinated carbon having a fluorine content of about 11 weight percent, based on the weight of total solids.

13. A process in accordance with claim 12, wherein the fluorinated carbon is present in an amount of from about 2 to about 3 percent by weight of a fluorinated carbon having a fluorine content of about 28 weight percent, and from about 2.5 to about 3 percent by weight of a fluorinated carbon having a fluorine content of about 11 weight percent, based on the weight of total solids.

14. A process in accordance with claim 13, wherein the fluorinated carbon is present in an amount of from about 2 weight percent of a fluorinated carbon having a fluorine content of about 28 weight percent, and about 3 percent by weight of a fluorinated carbon having a fluorine content of about 11 weight percent, based on the weight of total solids.

15. A process in accordance with claim 1, wherein said zinc oxide is added in an amount of from about 5 to about 8 percent by weight of material in the outer layer.

16. A process in accordance with claim 1, wherein said supporting substrate comprises an underlayer positioned over said supporting substrate.

17. A process in accordance with claim 16, wherein said underlayer comprises a material selected from the group consisting of epichlorohydrin rubber, silicone rubbers, ethylene propylene diene monomer, urethane, styrene-butadiene, nitrile-butadiene, fluoroelastomers, fluorosilicones, and copolymers thereof.

18. A process in accordance with claim 16, wherein said outer layer has a thickness of from about 0.5 to about 5 mm.

19. A process in accordance with claim 16, wherein said underlayer has a thickness of from about 1 to about 4 mm.

20. A process in accordance with claim 1, wherein a curative is added to said outer layer material along with the fluorinated carbon and zinc oxide.

21. A process in accordance with claim 20, wherein said curative is selected from the group consisting of hexamethylenediamine carbamate and N,N'-dicinnamylidene-1,6 hexanediamine.

22. A process in accordance with claim 21, wherein said curative is N,N'-dicinnamylidene-1,6 hexanediamine.

23. A process in accordance with claim 16, wherein the filled outer layer has a volume resistivity of from about $10^5$ to about $10^{12}$ ohm-cm.

24. A process in accordance with claim 23, wherein the filled outer layer has a volume resistivity of from about $10^7$ to about $10^{11}$ ohm-cm.

25. A process in accordance with claim 1, wherein said outer layer exhibits an absence in bleeding of contaminants when contacted with an imaging member for a period of time.

26. A process in accordance with claims 25, wherein said period of time is one week.

27. A process in accordance with claim 25, wherein said outer layer is contacted with an imaging member at a temperature of 50° C. and 95 percent relative humidity.

28. A process for providing an outer layer on a bias charging member comprising:
   a) mixing an outer layer material with fluorinated carbon and zinc oxide in an amount of from about 1 to about 15 percent by weight of the material in the outer layer to form a filled outer layer material; and
   b) subsequently applying at least one layer of said filled outer layer material on said bias charging member.

29. A process for providing an outer layer on a supporting substrate comprising:
   a) mixing a material with fluorinated carbon and zinc oxide in an amount of from about 1 to about 15 percent by weight of the material in the outer layer to form a filled outer layer material; and
   b) subsequently applying at least one of layer said filled outer layer material on said supporting substrate, wherein said filled outer layer has a volume resistivity of from about $10^5$ to about $10^{12}$ ohm-cm.

30. A process for providing an outer layer on a supporting substrate comprising:
   a) mixing a material selected from the group consisting of fluoroelastomer and polyamide, with fluorinated carbon and zinc oxide in an amount of from about 1 to about 15 percent by weight of the material in the outer layer to form a filled outer layer material; and
   b) subsequently applying at least one layer of said filled outer layer material on said supporting substrate, wherein said fluorinated carbon is selected from the group consisting of a fluorinated carbon having a fluorine content of about 62 weight percent, a fluorinated carbon having a fluorine content of about 11 weight percent, a fluorinated carbon having a fluorine content of about 28 weight percent, and a fluorinated carbon having a fluorine content of about 65 weight percent.

* * * * *